(12) United States Patent
Hoteit et al.

(10) Patent No.: US 10,125,323 B2
(45) Date of Patent: Nov. 13, 2018

(54) INTEGRATED HEAVY LIQUID FUEL COKING WITH CHEMICAL LOOPING CONCEPT

(71) Applicant: Saudi Arabian Oil Company, Dhahran (SA)

(72) Inventors: Ali Hoteit, Abqaiq (SA); Mourad Younes, Abqaiq (SA); Aqil Jamal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/650,432

(22) Filed: Jul. 14, 2017

(65) Prior Publication Data

US 2017/0313947 A1 Nov. 2, 2017

Related U.S. Application Data

(62) Division of application No. 14/510,497, filed on Oct. 9, 2014, now Pat. No. 9,790,437.

(51) Int. Cl.
*C10G 9/28* (2006.01)
*C10G 9/00* (2006.01)
(Continued)

(52) U.S. Cl.
CPC .............. *C10G 9/28* (2013.01); *C10G 9/005* (2013.01); *C10G 9/36* (2013.01); *C10G 11/04* (2013.01);
(Continued)

(58) Field of Classification Search
CPC ............ C10G 9/005; C10G 9/28; C10G 9/36; C10G 11/04; C10G 11/182; C10G 51/04;
(Continued)

(56) References Cited

U.S. PATENT DOCUMENTS 4,152,292 A 5/1979 Conner et al.
7,914,666 B1 3/2011 Mehlberg et al.
(Continued)

FOREIGN PATENT DOCUMENTS

CN 101278034 10/2008
CN 101351530 1/2009
(Continued)

*Primary Examiner* — Prem C Singh
*Assistant Examiner* — Brandi M Doyle
(74) *Attorney, Agent, or Firm* — Leason Ellis LLP

(57) ABSTRACT

A system integrating heavy fuel coking and chemical looping combustion is provided. The system includes a source of heavy fuel, a cracking reactor into which the fuel and metal oxides are introduced, a fuel reactor in fluid communication with the cracking reactor, and an air reactor in fluid communication with the fuel reactor. In the cracking reactor, the fuel undergoes a cracking reaction forming products and petcoke deposits on the metal oxides. The fuel reactor is configured to gasify metal oxides with petcoke deposits to produce syngas and reduce the metal oxides. The system transports a first portion of the reduced metal oxides to the cracking reactor and a second portion to the fuel reactor. The air reactor is configured to receive reduced metal oxides from the fuel reactor and oxidize them. The system is further configured to transport the oxidized metal oxides to the fuel reactor.

16 Claims, 1 Drawing Sheet

(51) Int. Cl.
*F23C 10/01* (2006.01)
*F23C 10/04* (2006.01)
*C10G 51/04* (2006.01)
*C10G 9/36* (2006.01)
*C10G 11/04* (2006.01)
*C10G 11/18* (2006.01)

(52) U.S. Cl.
CPC ............ *C10G 11/182* (2013.01); *C10G 51/04* (2013.01); *F23C 10/01* (2013.01); *F23C 10/04* (2013.01); *C10G 2300/107* (2013.01); *C10G 2300/4081* (2013.01); *C10G 2300/708* (2013.01); *C10G 2400/26* (2013.01); *Y02E 20/346* (2013.01)

(58) Field of Classification Search
CPC ...... C10G 2300/107; C10G 2300/4081; C10G 2300/708; C10G 2400/26; C01B 3/38; C01B 3/42; C01B 3/48; C01B 5/00; C10J 3/463; C10J 3/523; C10J 3/84; F23C 10/01; F23C 10/04; F23C 10/10; F23C 10/24; F23C 13/08
See application file for complete search history.

(56) References Cited

U.S. PATENT DOCUMENTS

| | | |
|---|---|---|
| 2008/0222956 A1 | 9/2008 | Tsangaris et al. |
| 2009/0149315 A1 | 6/2009 | Hedrick et al. |
| 2010/0104482 A1 | 4/2010 | Morin et al. |
| 2011/0171588 A1 | 7/2011 | Gauthier et al. |
| 2011/0303875 A1 | 12/2011 | Hoteit et al. |
| 2012/0214106 A1 | 8/2012 | Sit et al. |
| 2013/0149650 A1 | 6/2013 | Gauthier et al. |
| 2013/0255272 A1 | 10/2013 | Ajhar et al. |

FOREIGN PATENT DOCUMENTS

| | | |
|---|---|---|
| CN | 102300962 | 12/2011 |
| JP | S49-021283 | 2/1974 |
| JP | 2009-521588 | 6/2009 |
| JP | 2009-142811 | 7/2009 |
| WO | WO 2007/074304 | 7/2007 |

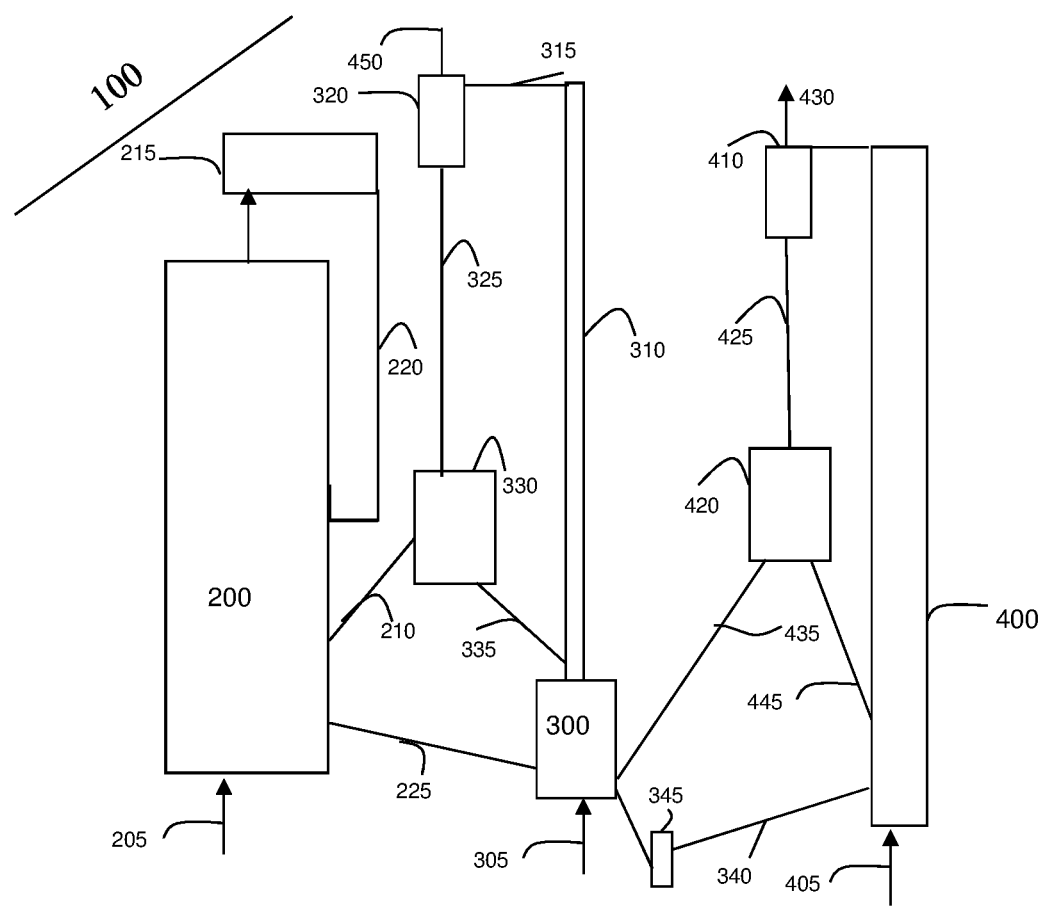

INTEGRATED HEAVY LIQUID FUEL COKING WITH CHEMICAL LOOPING CONCEPT

CROSS REFERENCE TO RELATED APPLICATION

The present application is a divisional of U.S. patent application Ser. No. 14/510,497, filed Oct. 9, 2014, the entire contents of which is incorporated by reference herein as if expressly set forth in its respective entirety herein.

TECHNICAL FIELD

The present invention relates to a process for heavy fuel coking and chemical looping combustion to produce heat and electricity. Further, the present invention relates to the valorization of heavy fuel via in-situ production of high-value petroleum-based products and the use of product gas for power generation.

BACKGROUND

Heavy oil, a variety of petroleum, is an abundant energy source that is found throughout the world. Of the world's total oil reserves, an estimated 53 percent are in the form of heavy oil or bitumen (terms are used interchangeably). In fact, heavy oil production is estimated to increase by 200 percent by 2030. Like the so-called "bottom of the barrel" of conventional petroleum, heavy oil is typically carbon-rich and extremely dense. Heavy oil is also highly viscous, solid or near-solid at room temperature, and has low hydrogen content and a high mass density (e.g., API gravity of 20 degrees or less).

Despite its abundance, the refining of heavy oil has proven to be a challenge. Conventionally, multiple technologies are used to upgrade various forms of heavy fuel, as it has been difficult to accomplish the upgrading using a single technology. For example, "vacuum distillation bottoms," which is liquid at 300-400° C. but remains a solid at room temperature, represents one of the most difficult types of heavy oil in a refinery to handle and transport. However, as the value of regular crude oil continues to increase, the need to upgrade heavy oil to a synthetic crude oil will continue to increase.

Circulating fluidized bed boilers can burn refinery by-products efficiently and cleanly. However, these fuels tend to be difficult to handle because they exit the refinery in liquid form at elevated temperatures and must be directly introduced into a combustor in this form. Circulating fluidized bed combustion (CFB) is a conventional industrial process normally used for coal and petcoke combustion, and has been the basis for the development of chemical looping combustion processes.

Chemical looping combustion (CLC) is a specific type of combustion process that was originally created in the 1950s to produce $CO_2$, but recently it has received increased attention as a potential $CO_2$ capturing process. In a conventional CLC process, an oxygen transfer material or "oxygen carrier" acts as an intermediate transporter of oxygen between two different reaction zones. The first zone where the fuel is injected is called a fuel reactor, and the second zone is called an air reactor, as air is injected into it to oxidize the oxygen carrier. Therefore, the CLC process prevents the direct contact of the air and the fuel. Typically, a solid metal oxide oxygen carrier is used to oxidize the fuel stream in a fuel reactor. This results in the production of $CO_2$ and $H_2O$. The reduced form of the oxygen carrier is then transferred to the air reactor, where it is contacted with air, re-oxidized to its initial state, and then returned back to the fuel reactor for further combustion reactions. CLC processes using a liquid hydrocarbon feed are known in the art. However, these processes do not upgrade heavy oil feeds into higher-value petroleum-based products in a single process.

Thus, there is a need for a single technology for upgrading heavy fuel to produce valuable petroleum-based products for use in power generation.

SUMMARY

The present invention is directed to a process for power generation integrating heavy liquid fuel coking with a chemical looping combustion concept. In one or more embodiments, heavy liquid fuel in injected into a cracking reactor along with reduced metal oxides (heat carriers), which resulting in a cracking reaction to produce petcoke deposits on the reduced metal oxide particles. The reduced metal oxide particles with petcoke deposits are transported from the cracking reactor to a fuel reactor where they are gasified in the presence of steam to produce a product gas stream, unburned gases, and reduced metal oxides. The product gas stream can be used in a combined cycle unit for power generation. A portion of the reduced metal oxides is transported from the fuel reactor back to the cracking reactor, and a portion is transported from the fuel reactor to an air reactor, where the reduced metal oxides are oxidized and then delivered back to the fuel reactor.

In one or more embodiments, one or more splitter reactors can be utilized in the system for circulating the metal oxides particles and thereby maintaining the pressure balance between the main reactors. In one or more embodiments, high-value petroleum-based products such as naphtha and/or gasoline can be produced from the cracking reaction in the cracking reactor. In at least one embodiment, a riser that is fluidly connected to the fuel reactor may be utilized. In the riser, a sulfur-absorbing material such as limestone is introduced and that material absorbs sulfur present in the unburned gases that were generated by the gasification reaction in the fuel reactor.

BRIEF DESCRIPTION OF THE DRAWING FIGURES

A more complete understanding of the invention and its many features and advantages will be attained by reference to the following detailed description and the accompanying drawing. It is important to note that the drawing illustrates only one embodiment of the present invention and therefore should not be considered to limit its scope.

FIG. 1 is a schematic of a process that integrates a chemical looping combustion cycle with a cracking reactor.

DETAILED DESCRIPTION OF CERTAIN EMBODIMENTS

The present application relates to a chemical looping combustion process that integrates heavy liquid fuel coking in a cracking reactor. The chemical looping combustion process of the present application eliminates many of the constraints of previous chemical looping configurations with liquid fuels and offers flexibility for the use of heavy liquid hydrocarbon feeds and vacuum residue feeds. In particular, in one or more variations, the CLC process of the present application utilizes heavy liquid fuel that undergoes a cracking reaction in the cracking reactor resulting in petcoke deposited on metal oxide particles. The "coked" metal oxide particles are then used as fuel for the chemical looping combustion in the fuel reactor. Other advantages associated with the present application will be appreciated in view of the following description.

FIG. 1 illustrates an exemplary system 100 for performing the chemical looping combustion process with integrated coking of heavy liquid fuel in accordance with the present application. FIG. 1 also shows an exemplary flow scheme that depicts a CLC process in accordance with the present application. In one or more embodiments, as exemplified in the system 100 of FIG. 1, the CLC system can have three main reaction zones: a first reaction zone defined by a cracking reactor 200; a second reaction zone defined by a fuel reactor 300; and a third reaction zone defined by an air reactor 400. The fuel reactor 300 can be operatively connected to both the cracking reactor 200 and the air reactor 400.

In one or more variations, the cracking reactor 200 is designed to facilitate a cracking reaction involving heavy liquid fuel and metal oxide particles, and it can take any number of suitable forms. In one or more variations, the cracking reactor 200 processes the heavy liquid fuel to produce higher value products with low boiling points, such as gasoline, gas oil, petcoke, diesel fuel, naphtha, $C_1$-$C_4$ gas, and liquefied petroleum gas (LPG). The cracking reactor 200 is designed such that fuel is injected into it via transport line 205. In one or more variations, the injected fuel is a heavy liquid fuel, such as residuum from vacuum distillation tower (vacuum residues) which frequently includes other heavy oils. In other embodiments, the fuel injected into the cracking reactor 200 can be a solid fuel or a gas fuel.

In one or more embodiments, the heat and energy needed for the cracking reaction of the fuel in the cracking reactor 200 is delivered by the metal oxides, which act as heat carriers and as oxygen carriers. The metal oxide particles are transported to the cracking reactor 200 via transport line 210. In one or more embodiments, the metal oxides can form a bed in the cracking reactor 200 which is fluidized by steam. In other variations, the cracking reactor 200 can be operated as a circulating fluidized bed or a turbulent bed. In one or more embodiments, the metal oxides are delivered to the cracking reactor in reduced form. In one or more embodiments, the heat carrier metal oxide particles enter the cracking reactor 200 with a temperature ranging from 482° C. to 507° C. The residence time of the heat carrier metal oxide particles in the cracking reactor 200 can range from 1 to 60 minutes, and preferably between 10 and 30 minutes. In exemplary embodiments, the pressure in the cracking reactor 200 ranges from 15 psig to 35 psig.

Under these conditions, in at least one embodiment, cracking reactions can proceed in the cracking reactor 200 to produce higher value products. The light fractions produced by the cracking reaction are sent to a separation device 215, where they are separated into gas, gasoline, naphtha, gas oil, and/or other higher value liquid products. The cracking reaction also results in the formation of a solid residuum of petcoke, which remains on the metal oxide particles (referred to herein as "coked metal oxides"). In one or more variations, some of the liquid products (e.g., naphtha and gas oil) can be recycled from the separation device 215 back to the cracking reactor 200 via transport line 220 to increase the petcoke yield on the metal oxide particles. In one or more variations, steam can also be introduced into the cracking reactor 200, and in the presence of steam, the coked metal oxide particles in the fluidized bed can be gasified resulting in a product gas (e.g., CO and $H_2$). In other words, the coke petcoke deposits on the metal oxides can be converted using the steam, and the rate of gasification of the petcoke is increased in the presence of steam. In one or more variations, baffles or packing can also be used to inhibit bypassing and the tendency to mix vertically in the fluidized bed in the cracking reactor 200.

The petcoke generated by the cracking of the heavy liquid fuel in the cracking reactor 200 and deposited on the metal oxide particles provides a material that is then used as fuel for the chemical looping combustion in the fuel reactor 300. In other words, the metal oxides act not only as an oxygen carrier but also as a physical carrier for the petcoke which then reacts when placed in the reactive conditions of the fuel reactor. The "coked" metal oxide particles are transported from the cracking reactor 200 to the fuel reactor 300 via transport line 225. In one or more variations, the "coked" metal oxide particles can form a bed in the bottom of the fuel reactor 300, which can be fluidized by steam and/or $CO_2$. Steam and/or $CO_2$ can be injected into the fuel reactor 300 via transport line 305. In the presence of steam, the "coked" metal oxides are gasified to produce a product gas stream. This product gas stream can comprise CO and $H_2$. In one or more embodiments, the product gas stream is syngas. In particular, the gasification reaction in the fuel reactor 300 can transform the petcoke on the metal oxide particles into clean syngas. In one or more embodiments, the clean syngas can then be utilized (e.g., burned) in a combine cycle unit that can be operatively connected to the chemical looping unit.

The petcoke present on the metal oxide particles is gasified in the fuel reactor 300 at high temperatures, typically between 850° C. and 1200° C., and preferentially between 950° C. and 1100° C. In one or more variations, the fuel reactor 300 is operated in a turbulent regime (turbulent bed), which promotes suitable mixing and metal oxide distribution in the fuel reactor 300, thereby enhancing the gasification reaction and the syngas yield. In other variations, the fuel reactor 300 can be operated as a fluidized bed or a circulating fluidized bed. The residence time of the coked metal oxide particles in the fuel reactor 300 can be between 1 and 15 minutes, and preferentially between 3 and 10 minutes. However, other residence times are possible in view of the specifics of the application and other parameters.

The fuel reactor 300 is designed based on gas superficial velocities and it can take any number of suitable forms. For exemplary fluidization gas distribution and good metal oxide mixing, a gas superficial velocity between 0.3 and 1.25 m/s is desired in the bottom portion of the fuel reactor 300, and preferentially between 0.5 and 0.75 m/s.

Following the gasification reaction in the fuel reactor 300, the reduced metal oxides, syngas, and unburned gases are then transported to the riser 310 (it will be understood that in some embodiments, the riser and fuel reactor can be combined as a single unit). In the riser 310, the unburned gases entrain portions of the relatively fine reduced metal oxide particles before passing via transport line 315 into a separating section 320. The syngas also passed from the riser 310 to the separating section 320 before exiting the system via transport line 450. In one or more variations, a sulfur-absorbing material such as limestone can also be introduced into the riser 310 such that the material absorbs sulfur present in the gases that were generated by the gasification reaction. The product of the reaction between the sulfur and sulfur-absorbing material (e.g. $CaSO_4$) can be eliminated from the system via the separation section 320. In one or more variations, the separating section 320 can include a cyclone separator, which functions in a conventional manner to separate the entrained particulate material (reduced metal oxide particles) from the unburned gases. The separating section 320 can thus be thought of as being a solid/gas separator.

After separation from the unburned gases, the reduced metal oxides are recirculated to the cracking reactor 200 and/or the fuel reactor 300. In one or more embodiments (as shown in FIG. 1), after separation from the unburned gases in the separator section 320, the reduced metal oxide particles are first transported via transport line 325 to a splitter reactor 330. The splitter reactor 330 maintains the pressure drop of the system by controlling the circulation of the metal oxide particles between the fuel reactor 300 and the cracking reactor 200. After exiting the splitting reactor, the reduced metal oxide particles can then be circulated back to the fuel reactor 300 via transport line 335 and/or back to the cracking reactor via transport line 210. In one or more variations, the circulation rate of the metal oxide particles is controlled via a pressure balance unit which is a device configured to control the solid circulation between the reactors. The pressure balance unit can also provide a technical indication about the control of the solid circulation. It will be understood that proper ducting (not shown) is provided to permit the fines of the metal oxides to pass from the fuel reactor 300 to the cracking reactor 200 via well-known separation media type cyclones, such as a U-beam.

Reduced metal oxides in the fuel reactor 300 can be delivered to the air reactor 400 via transport line 340 and loop seal 345 which is disposed along transport line 340. After entering the air reactor 400, the reduced metal oxides are oxidized by air injected into the air reactor 400 via transport line 405. In one or more variations, the reduced metal oxides are delivered to the bottom of the air reactor 400 where the air is injected, and thereby fluidizes the metal oxide particles. The fluidization in the base of the air reactor 400 can ensure that the reduced metal oxide flow is stable and smooth, which allows for a more efficient oxidation of the reduced metal oxides. The oxidation of the reduced metal oxides in the air reactor 400 is an exothermic reaction, and therefore results in the release of heat. The metal oxides are fully oxidized in the air reactor 400 and are oxidized at a rate sufficient to lift the particles up to a separation device 410 (via transport line 415) such as a cyclone, where the oxidized metal oxide particles are separated from the flue gas. After exiting the cyclone device 410, the oxidized metal oxides can be delivered to the fuel reactor and/or the air reactor. Alternatively, in one or more embodiments, the oxidized metal oxides are first delivered to a splitter reactor 420 via transport line 425, as shown in FIG. 1. The splitter reactor 420 maintains the pressure between the air reactor 400 and the fuel reactor 300 via control of the metal oxide circulation. Upon exiting the splitter reactor 420, the oxidized metal oxide particles can then be recirculated to the bottom of the fuel reactor 300 via standpipe 435 and/or recirculated back to the air reactor 400 via standpipe 445 in order to complete the oxidation reaction of the reduced metal oxides if it is not complete.

EXAMPLE

The following example is provided to better illustrate an embodiment of the present invention, but it should not be construed as limiting the scope of the present invention.

In this example, the metal oxide is a manganese-based metal oxide having a density of 4190 kg/m$^3$ and an oxygen transport capacity of about 10 weight percent. Only 19.2 percent of the oxygen participates in the reaction, which results in approximately 1.92 percent of oxygen transfer. Also, in this example, heavy liquid fuel is utilized. The amount of heavy fuel injected is approximately 10,000 barrels per day. The cracking reactor is operated to result in a cracking reaction product that is 10.50 percent gas, 42.11 percent liquids, and 47.31 percent petcoke. In particular, the gas has the composition of $C_1$ to $nC_4$, the liquid consists of gas oil and naphtha, and the petcoke contains sulfur, which is later treated in the riser via limestone injection. The metal oxide required to provide the necessary amount of oxygen to insure the partial combustion (which occurs as part of the gasification process) of the petcoke formed on the metal oxides particles is 1.2 tonnes/s.

The present invention provides several advancements over the prior art. First, it allows for the upgrade of heavy fuel to valuable petroleum products in a single process. The configuration of the present invention also provides an improvement over simply injecting the fuel into the fuel reactor or into a transporting zone. In particular, the injection of the fuel directly into a fuel reactor in contact with the metal oxide carriers can convert the fuel directly into $CO_2$ and $H_2O$ for power generation. In contrast, the configuration of the present disclosure allows for the upgrading of heavy fuel to valuable petroleum-based products, as well as for the production of petcoke to produce heat. Thus the configuration of the present invention allows for the combining of heavy fuel upgrading and power generation in a single process.

The present invention provides improved—and in some embodiments, complete—reduction of the oxygen carriers (metal oxides), which is not limited by the residence time of the oxygen carriers in the fuel reactor, increasing the size of the fuel reactor to increase residence time, or a lower oxygen carrier circulation rate. Additionally, as mentioned above, the recirculating of the reduced metal oxides to the cracking reactor provides the necessary heat for the cracking reaction. Additionally, the present invention produces petcoke in situ, thereby eliminating the needs of petcoke transportation, preparation, and heating. Further, in one or more variations, the present invention can combine the product gas obtained from the cracking reactor, and the product gas from the gasification of the petcoke (e.g. syngas) in the fuel reactor to deliver the necessary gas to operate a gas turbine. In one or more embodiments, the product gas obtained from the cracking reactor can include, but is not limited to $H_2$, $C_1$, $C_2$, $C_3$, and/or $nC_4$.

A further advantage of the present invention is that the circulation rate of the oxygen carrier (metal oxide) may be reduced while still allowing for the partial reduction of the oxygen carrier in the fuel reactor. This results in faster kinetics and more energy efficient reduction of the oxygen carrier as compared with prior processes. Finally, the present invention is not limited to heavy liquid fuels, but rather allows for the flexibility of injecting other types of fuels, including solid and gas fuels.

While the present invention has been described above using specific embodiments and examples, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A system that integrates heavy fuel coking and chemical looping combustion comprising:
    a source of heavy liquid fuel;
    a cracking reactor in fluid communication with the source of heavy liquid fuel via a channel and into which the heavy liquid fuel and metal oxides are introduced, and the heavy liquid fuel undergoes a cracking reaction to form petroleum-based products and petcoke particles are deposited on the metal oxides;
    a fuel reactor that is in fluid communication with the cracking reactor and receives the metal oxides with petcoke deposited thereon through a first conduit, the fuel reactor being configured for gasifying the metal oxides with petcoke deposits thereon with steam that is introduced into the fuel reactor resulting in the production of syngas, unburned gases, and reduced metal oxides;
    a riser that is in fluid communication with the fuel reactor and receives the syngas, unburned gases, and the reduced metal oxides, and is in fluid communication with the cracking reactor such that a first portion of reduced metal oxides is transported from the riser to the cracking reactor and a second portion of reduced metal oxides is transported from the riser to the fuel reactor;
    an air reactor that is in fluid communication with the fuel reactor through a second conduit and receives reduced metal oxides from the fuel reactor via the second conduit, the air reactor including an inlet for the introduction of air for oxidizing the reduced metal oxides to generate oxidized metal oxides and flue gases; and
    a third conduit that fluidly connects the air reactor and the fuel reactor such that a first portion of the oxidized metal oxides is transported from the air reactor to the fuel reactor, and a second portion of the oxidized metal oxides is recycled back to the air reactor.

2. The system of claim 1, further including a separation device in fluid communication with the cracking reactor through a fourth conduit, the separation device receiving the petroleum-based products from the cracking reactor.

3. The system of claim 1, further including a separator in fluid communication with the riser through a fourth conduit, the separator receiving the syngas, the unburned gases, and the reduced metal oxides from the riser, separating the syngas unburned gases from the reduced metal oxides, and transporting the reduced metal oxides to the cracking reactor and the fuel reactor.

4. The system of claim 3, further including a splitter reactor for maintaining pressure balance between the cracking reactor and the fuel reactor, the splitter reactor being fluidly connected to the separator by a fifth conduit and through which the reduced metal oxides from the separator pass prior to being received by the cracking reactor and the fuel reactor.

5. The system of claim 1, further including a separator in fluid communication with the air reactor through a fourth conduit, the separator receiving the oxidized metal oxides and flue gases from the air reactor, separating the oxidized metal oxides from the flue gases, and transporting the oxidized metal oxides to the fuel reactor and the air reactor.

6. The system of claim 5, further including a splitter reactor for maintaining pressure balance between the fuel reactor and the air reactor, the splitter reactor being fluidly connected to the separator by a fifth conduit and through which the oxidized metal oxides from the separator pass prior to being received by the fuel reactor and the air reactor.

7. The system of claim 1, wherein the metal oxides are disposed in a bed that is within the cracking reactor.

8. The system of claim 1, wherein the fuel reactor is one of a turbulent bed, fluidized bed, and circulating fluidized bed.

9. The system of claim 1, wherein the cracking reactor is one of a turbulent bed, fluidized bed, and circulating fluidized bed.

10. The system of claim 1, wherein the petroleum-based products comprise products selected from the group consisting of naphtha, gasoline, diesel fuel, petcoke, gas oil, and LPG.

11. The system of claim 2, wherein the system is configured to recycle the petroleum-based products from the separation device to the cracking reactor to increase the yield of petcoke deposited on the reduced metal oxides.

12. The system of claim 1, wherein the cracking reactor has a pressure in the range of 15 psig to 35 psig.

13. The system of claim 1, wherein the fuel reactor is operated at a temperature of the range of 850° C. to 1200° C. during gasification.

14. The system of claim 1, wherein the unburned gases contains sulfur.

15. The system of claim 14, wherein the riser is further configured to receive a sulfur-absorbing material.

16. The system of claim 15, wherein the sulfur-absorbing material is limestone.

* * * * *